(12) United States Patent
Parkvall et al.

(10) Patent No.: US 9,603,101 B2
(45) Date of Patent: Mar. 21, 2017

(54) TECHNIQUE FOR OPERATING A NETWORK NODE IN A HETEROGENEOUSLY DEPLOYED NETWORK

(75) Inventors: Stefan Parkvall, Bromma (SE); David Astely, Bromma (SE); Erik Dahlman, Stockholm (SE); Pal Frenger, Linkoping (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 174 days.

(21) Appl. No.: 14/385,954

(22) PCT Filed: Mar. 21, 2012

(86) PCT No.: PCT/EP2012/001238
§ 371 (c)(1),
(2), (4) Date: Sep. 17, 2014

(87) PCT Pub. No.: WO2013/139350
PCT Pub. Date: Sep. 26, 2013

(65) Prior Publication Data
US 2015/0085769 A1    Mar. 26, 2015

(51) Int. Cl.
*H04W 4/00* (2009.01)
*H04W 52/18* (2009.01)
*H04W 24/02* (2009.01)
*H04W 16/32* (2009.01)
*H04W 48/12* (2009.01)
*H04W 84/04* (2009.01)

(52) U.S. Cl.
CPC .......... *H04W 52/18* (2013.01); *H04W 24/02* (2013.01); *H04W 16/32* (2013.01); *H04W 48/12* (2013.01); *H04W 84/045* (2013.01)

(58) Field of Classification Search
None
See application file for complete search history.

(56) References Cited

U.S. PATENT DOCUMENTS

2011/0170496 A1* 7/2011 Fong ................ H04L 5/0053
370/329
2012/0236741 A1* 9/2012 Xu ................... H04B 7/024
370/252

OTHER PUBLICATIONS

NPL DMRS enhancements for CoMP : R1-112900 to 3GPP TSG RAN WG1.*

(Continued)

*Primary Examiner* — Chi H Pham
*Assistant Examiner* — Fahmida Chowdhury
(74) *Attorney, Agent, or Firm* — Leffler Intellectual Property Law, PLLC

(57) ABSTRACT

A technique for operating a network node in a heterogeneously deployed network comprising network nodes of different nominal transmit powers and at least partially overlapping coverage areas is described. A method implementation of this technique comprises a step of operating the network node in a base mode in which the network node is configured to transmit terminal-specific demodulation reference signals for a first set of terminal devices. The method comprises the further step of selectively activating or deactivating operation of the network node in a Single Frequency Network (SFN) mode in which the network node is configured to transmit, for a second set of terminal devices, the same cell-specific reference nodes as another network node of the heterogeneously deployed network that has a larger nominal transmit power.

20 Claims, 4 Drawing Sheets

(56) References Cited

OTHER PUBLICATIONS

NPL Demodulation reference Signal for E-PDCCH: R1-120732 to 3GPP TSG RAN WG1.*
PCT International Search Report, mailed Sep. 24, 2012, in connection with International Application No. PCT/EP2012/001238, all pages.
PCT Written Opinion, mailed Sep. 24, 2012, in connection with International Application No. PCT/EP2012/001238, all pages.
Huawei et al. "DMRS enhancements for CoMP" 3GPP Draft R1-112900, RAN WG1, Zhuhai, China, Oct. 4, 2011, XP050538112, pp. 1-2.
Nokia et al. "Demodulation reference signal for E-PDCCH" 3GPP Draft R1-120732, RAN WG1, Dresden, Germany, Jan. 31, 2012, XP050563114, pp. 1-3.
QUALCOMM Inc. "On the new carrier type in Rel-11" 3GPP Draft R1-114107, RAN WG1, San Francisco, California, USA, Nov. 8, 2011, XP050562083, pp. 1-2.
Huawei et al. "DMRS sequences for ePDCCH" 3GPP Draft R1-120870, RAN WG1, Dresden, Germany, Feb. 13, 2012, XP050563409, pp. 1-8.
Parkvall, S. et al. "Heterogeneous network deployments in LTE" Ericsson Review, No. 2, 2011, pp. 1-5.
3GPP TSG RAN WG1 Meeting #67, R1-113641, San Francisco, USA, Nov. 14-18, 2011, Enhancements of DL DMRS for CoMP, 4 pages.

* cited by examiner

TECHNIQUE FOR OPERATING A NETWORK NODE IN A HETEROGENEOUSLY DEPLOYED NETWORK

TECHNICAL FIELD

The present disclosure generally relates to a heterogeneously deployed network with network nodes of different nominal transmit powers. In particular, a technique for operating a network node of such a network is presented.

BACKGROUND

Heterogeneously deployed networks with network nodes of different nominal transmit powers and (at least partially) overlapping coverage areas are considered to be an interesting future deployment strategy for cellular networks. An introduction to such network deployments can be found in S. Parkvall et al., "Heterogeneous network deployments in LTE", Ericsson Review, No. 2, 2011, where LTE stands for the Long Term Evolution standard of the $3^{rd}$ Generation Partnership Project (3GPP).

FIG. 1 illustrates an example of a heterogeneously deployed network 10 with a low-power network node 12 and a high-power network node 14. The low-power network node 12 (in the following also called "pico node") is typically assumed to offer high data rates (Mbit/s) and high capacity (users/$m^2$ or Mbit/s/$m^2$) in local areas where this is needed or desired. On the other hand, the high-power network node 14 (in the following also called "macro node") is assumed to provide large-area coverage.

With reference to FIG. 2, in practice the macro node 14 may correspond to an existing cell 16 (a "macro cell"), while the pico node 12 may be deployed later to locally extend at least one of the capacity and achievable data rate within the coverage area of the macro cell 16 (where needed). In the scenario illustrated in FIG. 2, the pico node 12 corresponds to a cell 18 of its own (a "pico cell"). This means that, in addition to downlink and uplink data transmission or reception, the pico node 12 also transmits the full set of common signals and channels typically associated with a cell. For this reason the pico node 12 can be detected and selected (i.e., connected to) by a terminal device 20 within the pico cell 18.

In the exemplary LTE context illustrated in FIG. 2, the signals and channels transmitted by the pico node 12 for the terminal device 20 connected to the pico cell 18 include:

The Primary and Secondary Synchronization Signals (PSS and SSS), corresponding to the Physical Cell Identity of the pico cell 18.

The Cell-specific Reference Signals (CRS), also corresponding to the Physical Cell Identity of the pico cell 18. The CRS may, for example, be used for downlink channel estimation to enable coherent demodulation of downlink transmissions by the terminal device 20.

The Physical Broadcast Channel (PBCH), with corresponding pico-cell system information (additional system information may be transmitted on the Physical Downlink Shared Channel, PDSCH).

As the pico node 12 illustrated in FIG. 2 corresponds to a cell 18 of its own, also so-called Layer 1 (L1) and Layer 2 (L2) control signaling on the Physical Downlink Control Channel (PDCCH) (as well as on the Physical Control Format Indicator Channel, PCFICH, and the Physical Hybrid-ARQ Indicator Channel, PHICH) are transmitted from the pico node 12 to the connected terminal device 20. Such L1/L2 control signaling is performed in addition to downlink data transmission on the PDSCH and provides, for example, downlink and uplink scheduling information and Hybrid-ARQ-related information to the terminal device 20 within the pico cell 18.

As an alternative to the deployment scenario illustrated in FIG. 2, the pico node 12 within the heterogeneous network deployment may not correspond to a cell of its own but may just provide a data-rate and capacity "extension" of the macro cell 16 as shown in FIG. 3. Such a deployment is sometimes also referred to as "soft cell" (or "shared cell").

In a soft cell deployment, at least the CRS, PBCH, PSS and SSS are transmitted from the macro node 14. The PDSCH can be transmitted from the pico node 12. To allow for demodulation and detection of the PDSCH, despite the fact that no CRS is transmitted from the pico node 12, so-called Demodulation Reference Signals (DM-RSs) may be transmitted from the pico node 12 together with the PDSCH. The DM-RSs, which are terminal-specific, can then be used by the terminal device 20 for PDSCH demodulation and detection as known in the art.

Successfully receiving data from the pico node 12 that does not transmit CRS as described above requires DM-RS support in the terminal device 20 ("non-legacy" terminal). In LTE, DM-RS-based PDSCH reception is supported in Rel-10 and for Frequency Division Duplex (FDD), while for the L1/L2 control signalling, DM-RS-based reception is planned for Rel-11.

For terminal devices not supporting DM-RS-based reception ("legacy" terminals) one possibility for a soft cell scenario is a Single Frequency Network (SFN)-type of operation as illustrated in FIG. 4. In essence, identical copies of the signals and channels required by a legacy terminal are transmitted simultaneously from the macro node 14 and the pico node 12 during SFN operation. From a terminal perspective this looks like a single transmission. SFN operation will generally only provide a gain of the Signal to Interference-plus-Noise Ratio (SINR), which can be translated into a higher data rate, but will typically not result in a capacity improvement as transmission resources are not straight forward to re-use across sites within the same cell.

Summarizing the above, using the shared cell approach illustrated in FIG. 3 with DM-RSs to transmit data from the pico node 12 to the terminal device 20 provides gains in both capacity and data rates for non-legacy terminals supporting DM-RSs. It also provides benefits in energy efficiency as the pico node 12 needs to be active only at those points in time when it is involved in data transmissions to the terminal device 20. However, legacy terminals not supporting DM-RSs cannot benefit from the pico node 12 in this case. Alternatively, SFN operation between the pico node 12 and the macro node 14 may allow a legacy terminal to benefit from provision of the pico node 12, but in this case many of the benefits possible to obtain with non-legacy terminals, such as capacity and energy efficiency, cannot easily be achieved.

SUMMARY

There is a need for operating one or more nodes of a heterogeneously deployed network such that benefits of using transmissions based on terminal-specific demodulation reference signals can be exploited while still providing benefits for terminal devices not making use of these reference signals.

According to a first aspect, a method of operating a network node in a heterogeneously deployed network comprising network nodes of different nominal transmit powers and at least partially overlapping coverage areas is provided. The method comprises operating the network node in a base mode in which the network node is configured to transmit terminal-specific demodulation reference signals for a first set of terminal devices, and selectively activating or deactivating operation of the network node in a Single Frequency Network, SFN, mode in which the network node is configured to transmit, for a second set of terminal devices, the same cell-specific reference signals as another network node of the heterogeneously deployed network that has a larger nominal transmit power.

According to a first variant, operation in the base mode for the first set of terminal devices is maintained upon activating or deactivating operation in the SFN mode for the second set of terminal devices. As such, the network node may simultaneously serve terminal devices of the first set in the base mode and terminal devices of the second set in the SFN mode. According to a second variant, operation in the base mode for the first set of terminal devices is deactivated when operation in the SFN mode is active for the second set of terminal devices. The network node may for example switch between the base mode and the SFN mode. In the activated SFN mode, when the base mode for the first set of terminal devices has been deactivated, the network node may be configured to transmit also for the first set of terminal devices the same cell-specific reference signals as the other network node that has the larger nominal transmit power. The network node may thus be in the SFN mode for the terminal devices of the first set and of the second set.

A decision process may be performed to decide about activation or deactivation of operation in the SFN mode for one or both of the terminal devices of the first set and the terminal devices of the second set. This decision process may be performed independently from or in synchronicity with a further decision process to decide about activation or deactivation of operation in the base mode for the terminal devices of the first set.

The decision process with respect to activation or deactivation of operation in the SFN mode (for the terminal devices of the first set and/or the terminal devices of the second set) may be based on one of the presence, absence and number of terminal devices of the second set in the coverage area of the network node. Alternatively, or in addition, the decision process may be based on one of presence, absence and number of terminal devices of the second set in a coverage area of the other network node that has the larger nominal transmit power. In the above two cases, or in other cases, the decision process may (e.g., also) be based on positional information derived for one or more terminal devices.

As a further alternative, or in addition, the decision process may be based on one or more measurements performed and reported by one or more terminal devices of the second set. The one or more measurements may pertain to a quality of a signal received by the one or more terminal devices of the second set from the network node.

As another alternative, or in addition, the decision process may be based on a transmission activity of one or more terminal devices of the second set. As an example, the network node may be switched to the SFN mode for terminal devices of the second set (within a coverage area of the network node) for which downlink data enter the network for transmission.

Still further, or as another alternative, the decision process may be based on a predefined temporal pattern for activating or deactivating operation in the SFN mode. The predefined temporal pattern may take into account one or more of time-of-day (e.g., night time/day time), day-of-week (e.g., working day/weekend) and dedicated peak hours.

The decision process may be performed by the network node itself, the other network node with the larger nominal transmit power or any other network entity. In one implementation, two or more network entities perform a cooperative decision process.

Activation or deactivation of operation in the SFN mode may be triggered by an operational instruction received by the network node. As an example, when the decision process is at least partially performed by the other network node that has the larger nominal transmit power, the operational instruction may be received from that network node.

At least one of activating and deactivating operation in the SFN mode may comprise changing a power level of the cell-specific reference signals over a period of time. In such an implementation, a time period for increasing the power level when activating operation in the SFN mode may be different from a time period for decreasing the power level when deactivating operation in the SFN mode.

Activation or deactivation of operation in the SFN mode may be transparent for the terminal devices affected (or potentially affected) by the activation or deactivation. As an example, the terminal devices may be unaware of whether the network is operating such that cell-specific reference signals are transmitted only by the network node having the larger nominal transmit power or in the SFN mode.

The second set of terminal devices may be incapable of processing the terminal-specific demodulation reference signals. As such, the terminal devices of the second set may be "legacy" terminals. The first set of terminal devices may be capable of processing the terminal-specific demodulation reference symbols (and may thus belong to a group of "non-legacy" terminals). In an exemplary LTE realization, the terminal devices of the second set may, in contrast to the terminal devices of the first set, not be compliant with LTE Rel-10, Rel-11 or higher.

Also provided is a computer program product comprising program code portions for performing the steps of any of the methods and method aspects presented herein when the computer program product is executed in one or more processing devices, such as one or more processors installed on one or more of the network nodes presented herein. The computer program product may be stored on a computer-readable recording medium such as a CD-Rom, DVD, semiconductor memory, and so on. The computer program product may also be provided for download via a communication network such as the Internet or any other network.

Further provided is a network node for use in a heterogeneously deployed network comprising network nodes of different nominal transmit powers and at least partially overlapping coverage areas. The network node is operable in a base mode in which the network node is configured to transmit terminal-specific demodulation reference signals for a first set of terminal devices. The network node further comprises a processor configured to selectively activate or deactivate operation of the network node in a SFN mode in which the network node is configured to transmit, for a second set of terminal devices, the same cell-specific reference signals as another network node of the heterogeneously deployed network that has a larger nominal transmit power.

Still further, a heterogeneously deployed network is provided comprising the network node with the lower nominal transmit power as well as the other network node that has the larger nominal transmit power. In such a network, the network node with the lower nominal transmit power may be a pico node and the other network node with the larger nominal transmit power may be a macro node. As understood herein, a pico node typically has a smaller coverage area than a macro node. The terms "pico" and "macro" should, however, not be construed to be limited to any nominal transmit power or any nominal coverage area size. What matters is the potential difference with respect to the nominal transmit power (and nominal coverage area) between the two different types of nodes presented herein.

BRIEF DESCRIPTION OF THE DRAWINGS

Further details, aspects and advantages of the present disclosure will become apparent from the following description of exemplary embodiments in conjunction with the exemplary drawings, wherein FIG. 1 exemplarily shows a heterogeneous network deployment with a macro node of a higher nominal transmit power and a pico node of a lower nominal transmit power, wherein the pico node may be configured to embody the present disclosure.

DETAILED DESCRIPTION

In the following description of exemplary embodiments, for purposes of explanation and not limitation, specific details are set forth, such as specific network node configurations and cellular network types, to provide a thorough understanding of the present disclosure. It will be apparent to one skilled in the art that the technique presented herein may be practiced in other embodiments that depart from these specific details. The skilled person will appreciate, for example, that while the following embodiments will partially be described in terms of LTE Rel-10 and Rel-11, the technique presented herein is not limited to being implemented according to any specific 3GPP or non-3GPP standard. Moreover, while the technique presented herein will exemplarily be discussed in connection with macro nodes and pico nodes, it will be appreciated that the present disclosure is not limited to any particular type of node.

Those skilled in the art will further appreciate that the methods, steps and functions discussed herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores one or more programs that cause the processor to perform the steps discussed herein when executed by the processor.

Figure 1:
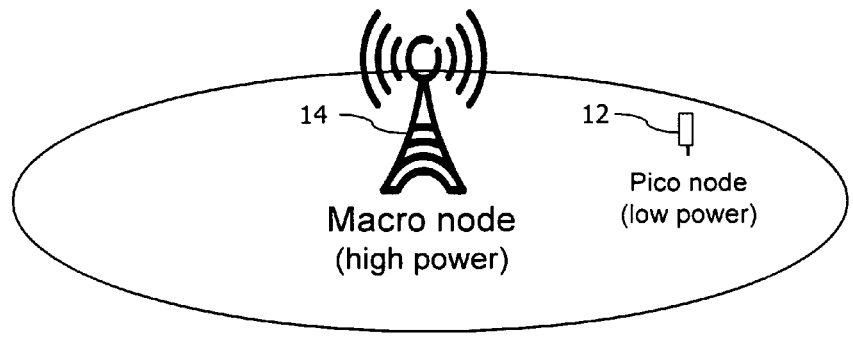
Figure 2:
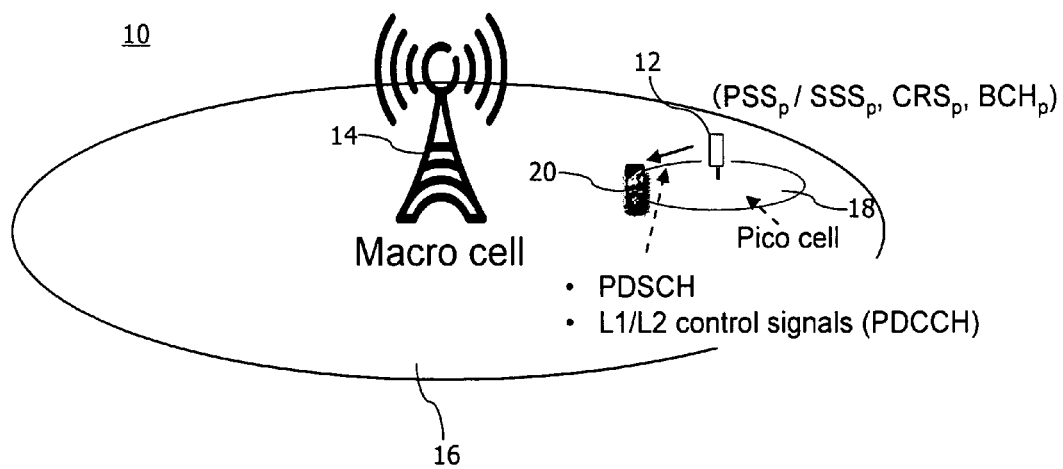
FIG. 2 shows a heterogeneous network deployment in which the pico node corresponds to a cell of its own.
Figure 3:
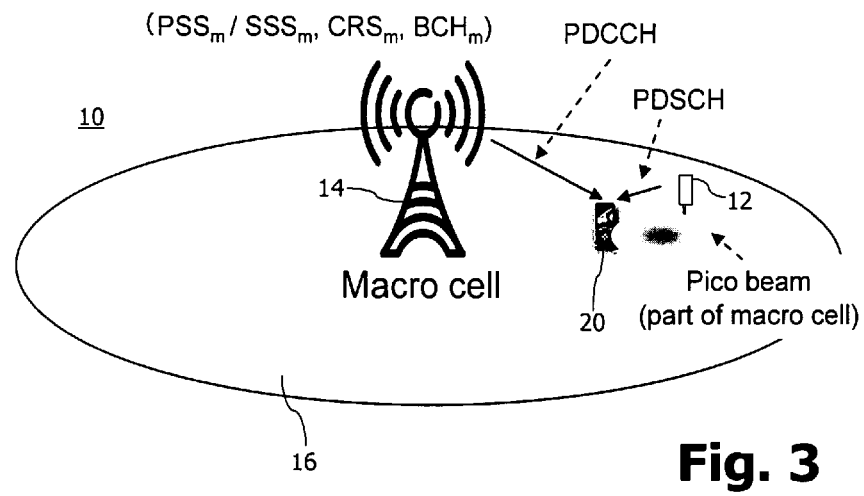
FIG. 3 schematically illustrates a heterogeneous network deployment with a soft cell configuration that may be adopted in a connection with an embodiment of the present disclosure.
Figure 4:
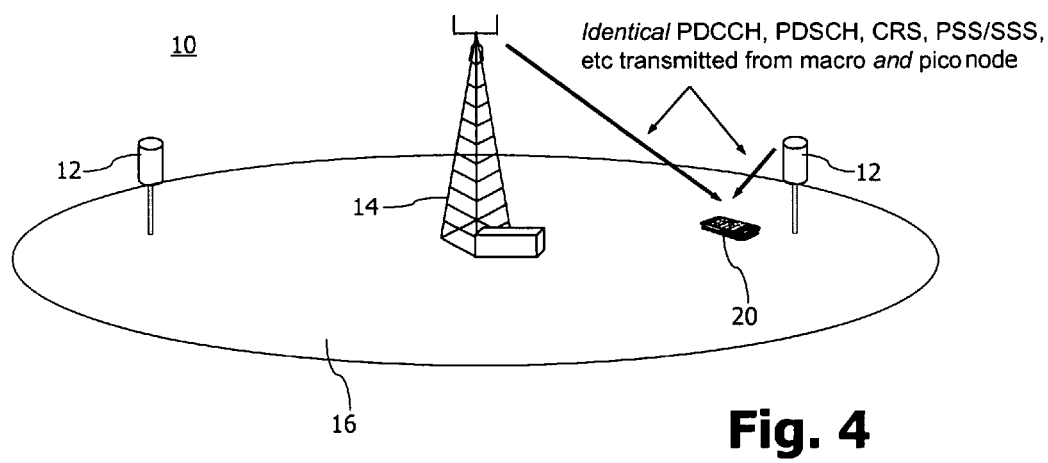
FIG. 4 schematically illustrates a heterogeneous network deployment with a soft cell configuration that may be adopted in a connection with an embodiment of the present disclosure.
Figure 5:
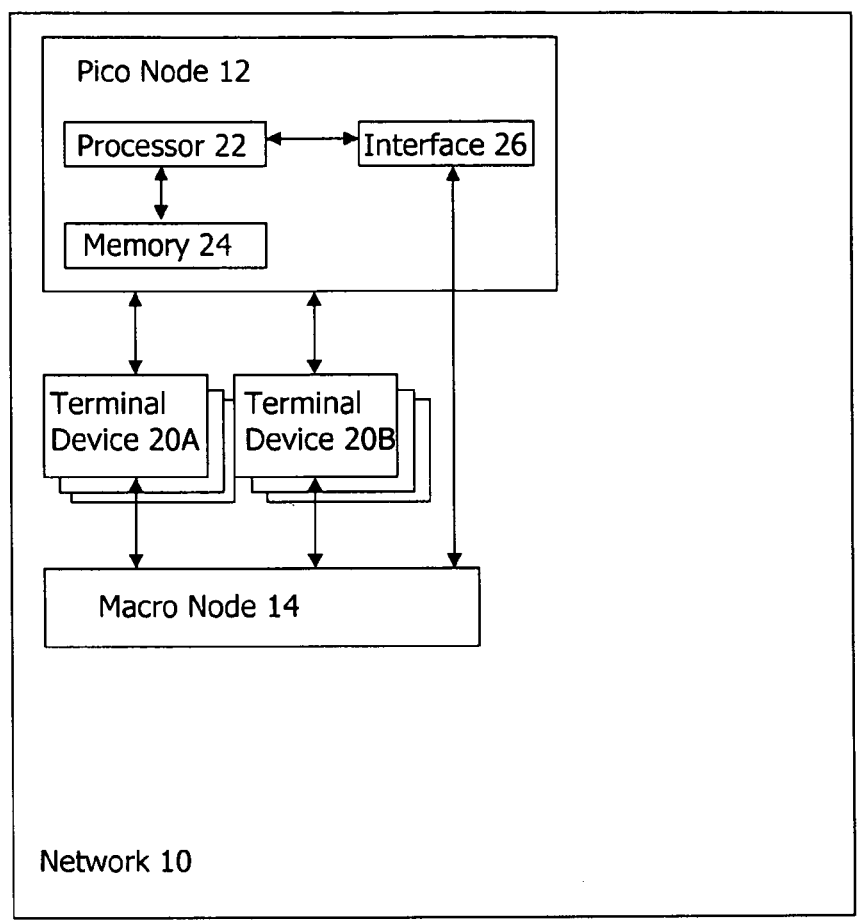
FIG. 5 schematically illustrates an embodiment of a network node for operation in the deployment scenarios illustrated in FIGS. 3 and 4.

FIG. 5 illustrates a block diagram of an embodiment of a heterogeneously deployed network 10 that may selectively be operated in one of both of the operational modes discussed above with reference to FIGS. 3 and 4. In the embodiment illustrated in FIG. 5, the network 10 comprises a single pico node 12 located within the coverage area of a single macro node 14. It should be noted that in other embodiments multiple pico nodes 12 may be provided within the coverage area of the macro node 14. Both the pico node 12 and the macro node 14 may be configured as a network access point (e.g., as a base station) that can be detected and selected by terminal devices 20A, 20B comprised by the network 10. The terminal devices 20A, 20B may be configured as mobile telephones, smartphones, data or network cards, tablet computers, laptop or stationary computers, machine-type devices (i.e., autonomous devices requiring no user interaction) etc. with wireless network access capabilities towards one or both of the pico node 12 and the macro node 14.

As shown in FIG. 5, the pico node 12 comprises a processor 22, a memory 24 as well as an interface 26 towards the macro node 14. The processor 22 of the pico node 12 is configured to operate the pico node 12 in one or both of a base mode and a SFN mode under control of a program residing in the memory 24 and, optionally, an operational instruction received via the interface 26 from the macro node 14 (or from any other entity within the network 10).

In the base mode, which can also be regarded as an energy efficient mode, the pico node 12 is configured to transmit terminal-specific demodulation reference signals for the first set of terminal devices 20A. The terminal devices 20A may be terminals capable of processing the terminal-specific demodulation reference signals. The processor 22 is further configured to selectively activate or deactivate operation of the pico node 12 in the SFN mode. In the SFN mode the pico node 12 is configured to transmit, for the second set of terminal devices 20B, the same cell-specific reference signals as the macro node 14. The terminal devices 20B of the second set may be terminals incapable of processing the terminal-specific demodulation reference signals transmitted in the base mode to the terminal devices 20A of the first set.

The terminal-specific demodulation reference signals may generally be reference signals that are subject to the same pre-coding as the associated data. Such reference signals may be transmitted only when a corresponding data transmission takes place. In such a case any terminal device 20A of the first set may deduce the channel needed for demodulation based on the fact that both the terminal-specific demodulation reference signals and the data are transmitted in a similar manner. With respect to the heterogeneous network deployment illustrated in FIG. 3, a data transmission based on terminal-specific demodulation reference signals does not have to be sent from the transmission point (e.g., the macro node 14) used for sending cell-specific reference signals. That is, the pico node 12 may be operated such that no cell-specific reference signals are transmitted (at least to the terminal devices 20A of the first set). As a result, time and/or frequency resources for data can be re-used at different transmission points (e.g., further pico nodes within the coverage area of the macro node 14). In one implementation, the demodulation reference signals are terminal-specific in that for different terminal devices 20A of the first set different demodulation reference signals are used. In an exemplary LTE configuration, the terminal-specific demodulation reference signals may take the form of DM-RSs.

The cell-specific reference signals may be configured such that the terminal devices 20B of the second set and/or the terminal devices 20A of the first set can derive a cell identity (of a soft cell) therefrom. As such, the cell-specific reference signals may not be terminal specific. In an exemplary LTE configuration, the cell-specific reference signals make take the form of CRSs.

In the base mode, the pico node 12 may become active only in subframes when it is transmitting to one of the terminal devices 20A of the first set (i.e., to a terminal device 20A that supports reception based on terminal-specific demodulation reference signals) for the channel in question, such as PDSCH in LTE Rel-10 or the PDSCH and ePDCCH in LTE in Rel-11. The pico node 12 may be configured to not (continuously) transmit any cell-specific reference signals in the base mode so as to improve energy efficiency of the pico node 12 and to reduce the overall interference level. The cell-specific reference signals may, however, be transmitted by the macro node 14 when the pico node 12 is in the base mode (as illustrated, for an exemplary LTE realization, in FIG. 3).

In the SFN mode, the pico node 12 may be configured to transmit (together with the macro node 14) at least the cell-specific reference signals that define a (soft) cell and the one or more channels necessary to access the network 10. Again in an exemplary LTE realization, as illustrated in FIG. 4, the signals defining the cell may comprise the CRSs (and, optionally, PSSs and SSSs). The one or more channels necessary to access the network 10 may comprise the PBCH. In addition, the pico node 12 may also transmit data for specific terminal devices (using, in an exemplary LTE implementation, for example the PDCCH and PDSCH).

A kind of synchronization may be required between the pico node 12 and the macro node 14 to ensure that the (identical) signals transmitted by the two nodes 12, 14 in the SFN mode are reasonably time aligned upon receipt by the terminal devices 20A, 20B. In practice this may mean that the pico node 12, which is typically closer to the terminal devices 20A, 20B served by it than the macro node 14, may transmit in the SFN mode at a slightly later point in time than the macro node 14 to compensate for the longer distance between the terminal devices 20A, 20B and the macro node 14. If it is assumed that the coverage area of the pico node 12 is modest compared to the coverage area of the macro node 14 (which is reasonable), it might be sufficient if the pico node 12 synchronizes its transmission with the timing of the macro node 14 as observed by the pico node 12.

In one operational scenario the pico node 12 is run in the base mode as much as possible upon presence of terminal devices 20A of the first set within its coverage area. The SFN mode is activated whenever necessary to support one or more of the terminal devices 20B of the second set. Such an operational scenario is capable of combining the benefits of the two distinct modes and over time, as the number of "legacy" terminal devices 20B decreases, will increase the energy efficiency of the network 10 as a whole. It should be noted that when the pico node 12 is configured to operate in the SFN mode and transmit cell-specific reference signals for one or more of the terminal devices 20B of the second set, the terminal devices 20A supporting terminal-specific demodulation reference signals can simultaneously be served (if desired) based on terminal-specific demodulation reference signals by the pico node 12.

Figure 6:
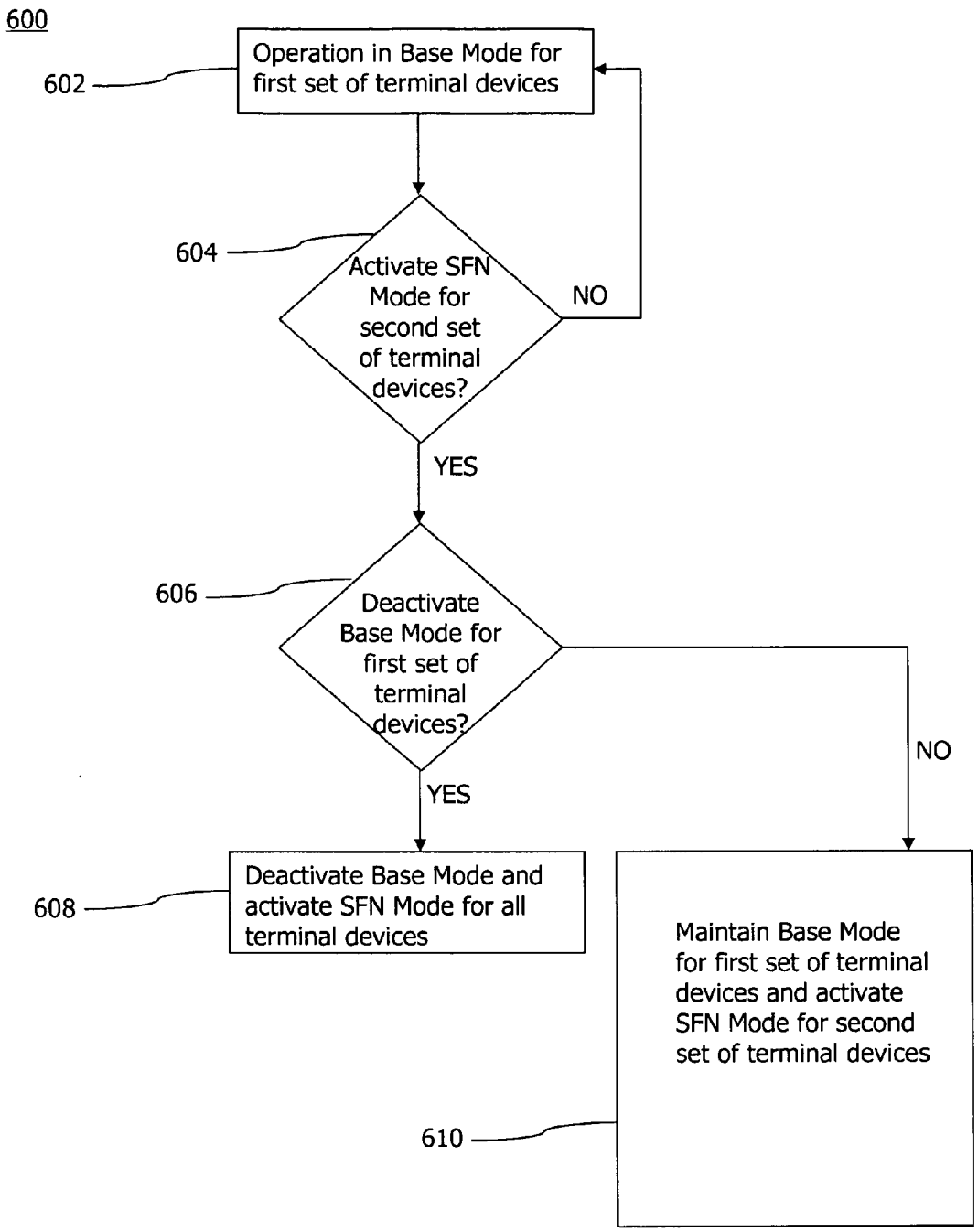
FIG. 6 shows a flow diagram illustrating a method embodiment of operating the network node of FIG. 5.

In the following, control and operation of the pico node 12 will exemplarily be described in more detail with reference to FIG. 6. FIG. 6 shows a flow diagram with individual operational and decision steps performed by the pico node 12, the macro node 14 or another entity of the network 10. It should be noted that the steps could also be performed in a distributed manner by different network entities.

With reference to FIG. 6, and as identified with reference numeral 600, the pico node 12 is assumed to initially operate in base mode for one or multiple terminal devices 20A of a first set within its coverage area (see step 602). In other embodiments, operation of the pico node 12 may start with powering-up of the pico node 12, so that pico node 12 will initially not serve any terminal devices 20A, 20B at all.

In a next step 604 a decision process is performed. Specifically, it is decided about activation of the SFN mode for one or more terminal devices 206 of the second set (that may have entered a coverage area of the pico node 12). Various examples for parameters on which the decision process in step 604 can be based will be discussed in more detail below.

If it is decided in step 604 that the SFN mode is not to be activated, the method loops back to step 602 and the pico node 12 continues operating in the base mode (thus keeping the SFN mode deactivated). If, on the other hand, the decision process carried in step 604 results in a decision to activate the SFN mode for one or more terminal devices 20B of the second set, the method continues with a further decision process in step 606.

In step 606 it is decided whether or not to deactivate the base mode for the terminal devices 20A of the first set. If it is decided in step 606 to deactivate the base mode for the terminal devices 20A of the first set, the method proceeds to step 608. In step 608 the base mode is deactivated for the terminal devices 20A of the first set, and at the same time the SFN mode is activated for both the terminal devices 20B of the second set and the terminal devices 20A of the first set. As such, the pico node 12 switches from the base mode (for terminal devices 20A of the first set) to the SFN mode (for all terminal devices 20A, 20B). Such a switch may occur when any terminal device 20B of the first set enters the coverage area of the pico node 12.

If, on the other hand, it is decided in step 606 that the base mode for the terminal devices 20A of the first set is to be maintained, the method continues with step 610. In step 610, the base mode is maintained for the terminal devices 20A of the first set, and, at the same time, the SFN mode is activated for one or more terminal devices 20B of the second set. The pico node 12 will thus appear to be in the base mode for the terminal devices 20A of the first set. As, in one implementation, the SFN mode may be transparent, the terminal devices 20B of the second set may not be aware of the pico node 12 operating in an SFN mode with the macro node 14.

The macro node 14 might generally be configured to switch between the transmission of either terminal-specific demodulation reference signals ("base mode") or the transmission of cell-specific reference signals ("SFN mode" with pico node 12 or "regular" transmission independently from pico node 12).

The SFN mode may be deactivated again (following step 608 and 610). Such a deactivation may, for example, be performed in cases in which all terminal devices 20B of the second set have left the coverage area of the pico node 12. Generally, the activation and deactivation of the SFN mode may be performed such that the terminal devices 20B of the second set are not negatively impacted.

In certain implementations the decision step 606 may be omitted. In such a case it may be a statically implemented designed choice whether or not to deactivate the base mode upon a decision in step 604 to activate the SFN mode. As such, the process may jump from step 604 directly to either one of step 608 and step 610 and the other one of step 608 and step 610 may be omitted also.

Moreover, while not specifically illustrated in FIG. 6, the SFN mode may be deactivated in response to a further decision step following step 608 and/or step 610. After deactivation of the SFN mode following step 610, the process may jump back to step 602. After deactivation of the SFN mode following step 608, the process may automatically or after another decision step activate the base mode again and then jump back to step 602. In principle, the decisions for deactivating the SFN mode and activating the base mode may be performed on the basis of decisions and parameters identical with or similar to those in step 604 and 606.

Several functions in the terminal devices 20B of the second set (such as channel estimation processes and handover measurements) exploit the transmission of the cell-specific reference signals. Abruptly turning the transmission of these reference signals on or off by the pico node 12 may, from a terminal perspective, appear as a discontinuity in fading, for which channel estimation processes and handover measurements may not have been designed. Therefore, upon activating or deactivating the SFN mode a power level of the cell-specific reference signals may be changed (e.g., continuously or step-wise) over a certain period of time. A time period for increasing the power level when activating operation in the SFN mode may be different from a time period for decreasing the power level when deactivating operation in the SFN mode. In certain configurations, during a power decrease, the pico node 12 no longer needs to provide support for the terminal devices 20B of the second set. As such, it may become possible to perform the power decrease faster than the power increase since there are no active data transmissions for such terminal devices 20B involving the pico node 12 during the power decrease. The corresponding time period(s) for power increase and power decrease may also depend on the characteristics of the terminal devices 20B to be served.

Generally, the period of time for changing the power level of the cell-specific reference signals should be slow enough to not seriously interfere with terminal-specific functionalities that are based on the assumption of a constant transmission power. Rather, the change should appear similar as fading to the terminal devices 20B of the second set.

Whether a specific terminal device is capable of processing the terminal-specific demodulation reference signals or not (e.g., whether a particular terminal device belongs to the first set or the second set illustrated in FIG. 5) is generally known within the network, at least after the terminal device has attached to the network. The position of a terminal device (i.e., whether the terminal device is within a coverage area of the pico node 12 or macro node 14) can generally be derived using uplink measurements, positioning techniques or other processes. In light of such knowledge, the decision process in step 604 and/or the decision process in step 606 can be based on different parameters.

As an example, the decision processes may be based on one of presence, absence and number of terminal devices 20B of the second set in the coverage area of the pico node 12 (and/or the macro node 14). As an example, presence of at least one terminal device 20B of the second set in the coverage area of the pico node 12 may trigger an activation of the SFN mode for that device in step 604. At the same it may (or may not) be decided to deactivate the base mode (if activated) for terminal devices 20A of the first set. If no terminal device 20B of the second set reports sufficiently good signal strength from the pico node 12, the pico node 12 can remain (or be switched to) the base mode in step 606.

As a further example, the decision process carried out in step 604 and/or the decision process carried out in step 606 may be based on a transmission activity with respect to the terminal devices 20B of the second set. If, for example, downlink data needs to be transmitted to such a terminal device 20B (and the terminal device 20B is in the coverage area of the pico node 12), the SFN mode can be activated in step 604. Data transmission to that terminal device 20B may take place during the power-up phase of the cell-specific reference signals (in which case the power level of the data channel from the pico node 12 may follow the same power-up behaviour as the cell-specific reference signals). Alternatively, data transmission may be postponed until the power-up phase of the cell-specific reference signals has ended. If no data is to be transmitted to a terminal device 20B of the second set within a given time period after the last data transmission (or after any other event) it may be decided to deactivate the SFN mode and/or remain in the base mode. Alternatively, following step 608, also a switch from the SFN mode for all terminal devices 20A, 20B to the base mode for the terminal devices 20A of the first set may occur.

As a still further decision parameter that may be used for the decision process in step 604 and/or the decision process in step 606, a predefined temporal pattern may be implemented. As an example, the pico node 12 may be put in the base mode (and thus serve only the terminal devices 20A of the first set) during night time, while during day time the SFN mode is activated for all terminal devices.

The decision process in step 604 and/or the decision process in step 606 may be taken by any entity of the network 10. As an example, the decision process may autonomously be performed by the pico node 12. Alternatively, an operational instruction regarding activation/deactivation of the SFN mode or activation/deactivation of the base mode may be received from the macro node 14 via the interface 26 (see FIG. 5). In an exemplary LTE configuration, the interface 26 towards the macro node 14 may be configured as the X2 interface.

It should be noted that the pico node 12 does not need to create a carrier of its own in the soft cell scenario discussed herein. Rather, the soft cell approach may be regarded as using a geographically distributed antenna system. Accordingly, the present disclosure may be regarded as describing the specific signalling sent from different antennas (of different nodes 12, 14) in different situations.

As has become apparent from the above description, the technique presented herein permits the introduction of pico nodes 12 within an existing network of macro nodes 14 in an energy efficient manner. Specifically, the present disclosure enables exploiting the benefits of the base mode for "non-legacy" terminals while at the same time providing adequate support for "legacy" terminals.

While the technique presented herein has been described with reference to particular embodiments, those skilled in the art will recognize that the present invention is not limited to the specific embodiments described and illustrated herein. It is to be understood that this disclosure is only illustrative. Accordingly, it is intended that the invention be limited only by the scope of the claims appended hereto.

The invention claimed is:

1. A method of operating a network node in a heterogeneously deployed network comprising network nodes of different nominal transmit powers and at least partially overlapping coverage areas, the method comprising:
   operating the network node in a base mode in which the network node is configured to transmit terminal-specific demodulation reference signals;
   wherein the terminal-specific demodulation reference signals are transmitted for a first set of terminal devices; and
   the method further comprises selectively activating or deactivating operation of the network node in a Single Frequency Network (SFN) mode in which the network node is configured to transmit, for a second set of terminal devices, the same cell-specific reference signals as an other network node of the heterogeneously deployed network that has a larger nominal transmit power;
   wherein operation in the base mode for the first set of terminal devices is deactivated upon activating operation in the SFN mode for the second set of terminal devices; and
   wherein in the activated SFN mode, when the base mode for the first set of terminal devices is deactivated, the network node is configured to transmit, also for the first set of terminal devices, the same cell-specific reference signals as the other network node that has the larger nominal transmit power.

2. The method of claim 1, wherein, in the base mode, the network node is active for a terminal device of the first set only when it is transmitting to that terminal device.

3. The method of claim 1, wherein operation in the base mode for the first set of terminal devices is maintained upon activating or deactivating operation in the SFN mode for the second set of terminal devices.

4. The method of claim 1, further comprising performing a decision process to decide about activation or deactivation of operation in the SFN mode.

5. The method of claim 4, wherein the decision process is based on one of presence, absence and number of terminal devices of the second set in a coverage area of the network node.

6. The method of claim 4, wherein the decision process is based on one of presence, absence and number of terminal devices of the second set in a coverage area of the other network node that has the larger nominal transmit power.

7. The method of claim 4, wherein the decision process is based on one or more measurements performed and reported by one or more terminal devices of the second set.

8. The method of claim 7, wherein the one or more measurements pertain to a quality of a signal received by the one or more terminal devices of the second set from the network node.

9. The method of claim 4, wherein the decision process is based on a transmission activity of one or more terminal devices of the second set.

10. The method of claim 4, wherein the decision process is based on a predefined temporal pattern for activating or deactivating operation in the SFN mode.

11. The method of claim 1, wherein activation or deactivation of operation in the SFN mode is triggered by an operational instruction received by the network node.

12. The method of claim 4, wherein activation or deactivation of operation in the SFN mode is triggered by an operational instruction received by the network node, and wherein the decision process is at least partially performed by, and the operational instruction is received from, the other network node that has the larger nominal transmit power.

13. The method of claim 1, wherein at least one of activating and deactivating operation in the SFN mode comprises changing a power level of the cell-specific reference signals over a period of time.

14. The method of claim 13, wherein a time period for increasing the power level when activating operation in the SFN mode is different from a time period for decreasing the power level when deactivating operation in the SFN mode.

15. The method of claim 1, wherein activation or deactivation of operation in the SFN mode is transparent for the terminal devices.

16. The method of claim 1, wherein the second set of terminal devices is incapable of processing the terminal-specific demodulation reference signals.

17. A non-transitory processor-readable storage medium comprising program code portions for performing a method of operating a network node in a heterogeneously deployed network comprising network nodes of different nominal transmit powers and at least partially overlapping coverage areas when the program code portions are executed on one or more processing devices, the method comprising:
   operating the network node in a base mode in which the network node is configured to transmit terminal-specific demodulation reference signals;
   wherein the terminal-specific demodulation reference signals are transmitted for a first set of terminal devices; and
   the method further comprises selectively activating or deactivating operation of the network node in a Single Frequency Network (SFN) mode in which the network node is configured to transmit, for a second set of terminal devices, the same cell-specific reference signals as an other network node of the heterogeneously deployed network that has a larger nominal transmit power;
   wherein operation in the base mode for the first set of terminal devices is deactivated upon activating operation in the SFN mode for the second set of terminal devices; and
   wherein in the activated SFN mode, when the base mode for the first set of terminal devices is deactivated, the network node is configured to transmit, also for the first set of terminal devices, the same cell-specific reference signals as the other network node that has the larger nominal transmit power.

18. A network node for use in a heterogeneously deployed network, the heterogeneously deployed network comprising network nodes of different nominal transmit powers and at least partially overlapping coverage areas;
   wherein the network node is operable in a base mode in which the network node is configured to transmit terminal-specific demodulation reference signals;
   wherein the network node is further configured to transmit, for a first set of terminal devices, the terminal-specific demodulation reference signals; and
   the network node comprises a processor configured to selectively activate or deactivate operation of the network node in a Single Frequency Network (SFN) mode in which the network node is configured to transmit, for a second set of terminal devices, the same cell-specific reference signals as an other network node of the heterogeneously deployed network that has a larger nominal transmit power;
   wherein the processor is further configured to deactivate operation in the base mode for the first set of terminal devices upon activating operation in the SFN mode for the second set of terminal devices; and wherein the network node is configured, while in the activated SFN mode, when the base mode for the first set of terminal devices is deactivated, to transmit, also for the first set of terminal devices, the same cell-specific reference signals as the other network node that has the larger nominal transmit power.

19. A heterogeneously deployed network comprising the network node of claim 18 and the other network node that has the larger nominal transmit power.

20. The heterogeneously deployed network of claim 19, wherein the network node is a pico node and the other network node that has the larger nominal transmit power is a macro node.

* * * * *